US012775860B2

(12) United States Patent
Stockert et al.

(10) Patent No.: US 12,775,860 B2
(45) Date of Patent: Oct. 27, 2026

(54) SYSTEM AND METHOD FOR QUANTUM AND CLASSICAL NETWORK MANAGEMENT

(71) Applicants: AT&T Intellectual Property I, L.P., Atlanta, GA (US); AT&T Mobility II LLC, Atlanta, GA (US)

(72) Inventors: Mark Stockert, San Antonio, TX (US); Thomas J. Routt, Sequim, WA (US); Jerry Robinson, Middletown, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 947 days.

(21) Appl. No.: 17/939,544

(22) Filed: Sep. 7, 2022

(65) Prior Publication Data

US 2024/0078457 A1 Mar. 7, 2024

(51) Int. Cl.

| | |
|---|---|
| ***G06N 10/20*** | (2022.01) |
| ***H04L 41/14*** | (2022.01) |
| ***H04L 41/16*** | (2022.01) |

(52) U.S. Cl.

CPC .......... *G06N 10/20* (2022.01); *H04L 41/145* (2013.01); *H04L 41/16* (2013.01)

(58) Field of Classification Search

None

See application file for complete search history.

(56) References Cited

U.S. PATENT DOCUMENTS

| | | | | |
|---|---|---|---|---|
| 7,451,292 | B2 | 11/2008 | Routt | |
| 8,190,553 | B2 | 5/2012 | Routt | |
| 10,244,581 | B2 | 3/2019 | Routt | |
| 10,965,777 | B2 | 3/2021 | Stockert et al. | |
| 2017/0186307 | A1* | 6/2017 | Kim | H04L 67/12 |
| 2020/0364607 | A1* | 11/2020 | BahenaTapia | G06N 7/01 |
| 2021/0084505 | A1* | 3/2021 | Yoon | H04W 24/08 |

(Continued)

OTHER PUBLICATIONS

Stockert, et al., "Network Optimization for Hybrid Quantum-Classical Networks", U.S. Appl. No. 17/813,848, filed Jul. 20, 2022, 39 pages.

*Primary Examiner* — Xuyang Xia

(74) *Attorney, Agent, or Firm* — Guntin & Gust, PLC; Colin LaRose

(57) ABSTRACT

Aspects of the subject disclosure may include, for example, providing, by a global node, a model to a group of nodes of a network, the model being associated with determining a configuration of the network for qubits; receiving, by the global node from one or more nodes of the group of nodes, updated model parameters, wherein the updated model parameters are generated by each of the one or more nodes via training of a local model utilizing the model and local data accessible to the particular node of the one or more nodes resulting in local nodes; generating, by the global node, an updated model based on the updated model parameters, the updated model being associated with determining the configuration of the network for the qubits; and providing, by the global node, the updated model to the group of nodes of the network, wherein the updated model facilitates managing distribution and usage of entangled qubit storage in devices of the network as reserve hybrid quantum-classical network capacity for bandwidth and computing. Other embodiments are disclosed.

20 Claims, 12 Drawing Sheets

(56) References Cited

U.S. PATENT DOCUMENTS

| | | | | |
|---|---|---|---|---|
| 2021/0176055 | A1* | 6/2021 | Rahman | H04L 9/0855 |
| 2022/0172069 | A1* | 6/2022 | Kim | G06N 3/04 |
| 2022/0269976 | A1* | 8/2022 | Wang | H04L 9/0855 |
| 2023/0375580 | A1* | 11/2023 | Nakajima | G16H 10/40 |
| 2024/0281719 | A1* | 8/2024 | Duan | H04L 41/16 |

* cited by examiner

200

220

230

240

250

285

280

290

300

600

SYSTEM AND METHOD FOR QUANTUM AND CLASSICAL NETWORK MANAGEMENT

FIELD OF THE DISCLOSURE

The subject disclosure relates to a system and method for quantum and classical network management.

BACKGROUND

Network capacity is an important issue that service providers attempt to efficiently manage. As an example, in a wide area disaster or emergency, there is potentially large demand for secure 5G/6G network capacity. During a wide area disaster 5G/6G network traffic often exceeds the available capacity resulting in rationed capacity with priority services and traffic throttling (i.e., overload controls, network management, and other methods employed to limit traffic and protect the network). Communications networks, including those designed for first responders, have a finite amount of capacity (e.g., bandwidth) that can be exceeded in a disaster. In addition, network capacity may be reduced by damage to network infrastructure from a wide area disaster.

Other events can affect the need for network capacity. As the user base grows, the demand for network capacity in a particular region naturally increases even absent a particular event.

BRIEF DESCRIPTION OF THE DRAWINGS

Reference will now be made to the accompanying drawings, which are not necessarily drawn to scale, and wherein.

DETAILED DESCRIPTION

Figure 1:
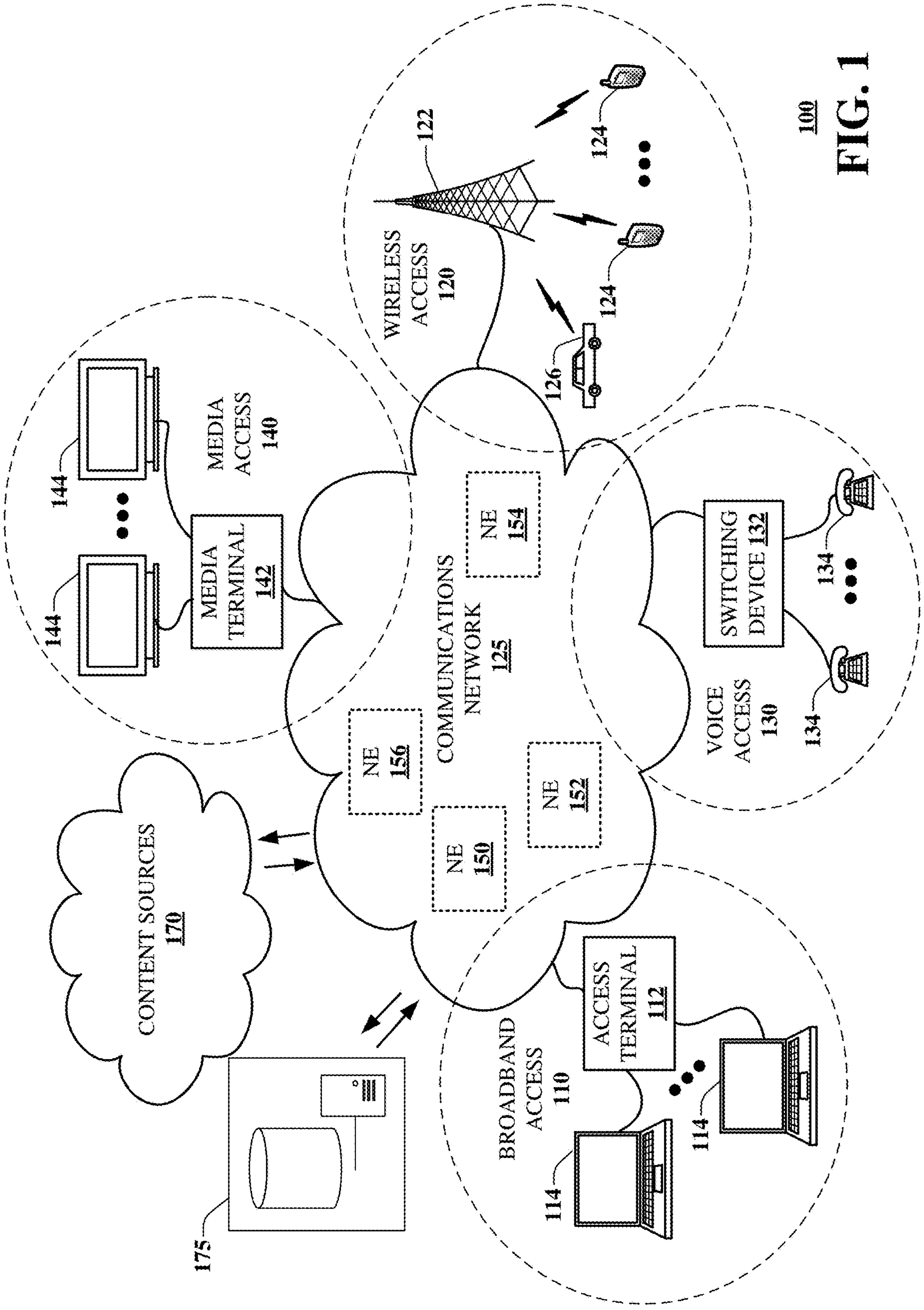
FIG. 1 is a block diagram illustrating an exemplary, non-limiting embodiment of a communications network in accordance with various aspects described herein.

The subject disclosure describes, among other things, illustrative embodiments for managing network [e.g., 5G, 6G, Next Generation (NG)] entangled qubit compute/memory/bandwidth storage, management, and distribution. The systems and methods can manage the distribution of qubits (e.g., nodes and/or User Equipment (UEs) to distribute to in a network) based on various criteria such as traffic, predicted demand, configuration of a network in an emergency (e.g., resiliency such as if nodes are not available, reconfigure, alternate route). One or more embodiments can determine distribution points for entangled qubits, what types of distribution to use (e.g., physical, photonic, and so forth), storage policies and/or smart contracts. One or more embodiments provide an identity, location and priority authentication process to create unique tokens for bandwidth allocation.

In one or more embodiments, a system and method is provided for optimizing or improving performance of hybrid quantum-classical networks based on network entangled qubit compute/bandwidth storage. For example, distributed quantum-classical compute/bandwidth resource controllers can be provided such as network nodes (e.g., 5G, 6G, NG nodes) that contain quantum memory for long-lived storage of entangled qubits. In one or more embodiments, the resource controller(s) can perform quantum computation, qubit entanglement distillation, and quantum error correction. In one or more embodiments, the resource controller includes superdense coding quantum communications protocols for communicating classical bits of information by only transmitting a smaller number of qubits between controllers and other quantum-classical network elements. In one or more embodiments, initial deployment of quantum/classical networks can include an overlay of quantum network elements and classical network elements where elements can be hybrid quantum/classical, classical and/or quantum only. In one or more embodiments, quantum computing elements and quantum memory can be adjunct to the resource controller(s).

In one or more embodiments, global federated reinforcement learning model updates can be stored in a blockchain database to provide transparency, auditability, human modification, and explainability of the global model and model changes. In one or more embodiments, global updates can be available for review, approval, and modification by human operators before, during and after model updates are sent to local agents. In one or more embodiments, explainability, or Explainable Machine Learning (XML) can be provided to improve public safety trust and confidence in the Quantum Machine Reinforcement Learning (QMRL) system.

In one or more embodiments, a network superdense coding optimizer quantum computation application can be utilized which determines optimized or improved network qubit distribution/storage more rapidly than via classical computers.

In one or more embodiments, a quantum-classical neural network model can be executed or otherwise run until an approximate optimal (or improved to a particular threshold) distributed, entangled qubit configuration is reached. In one or more embodiments, a distributed quantum graph blockchain database(s) can be utilized that securely stores and manages network entangled qubit compute/bandwidth storage as reserve hybrid quantum-classical network capacity and smart contracts.

In one or more embodiments, distributed and networked quantum-classical graph blockchain database(s) can store a distributed ledger of compute/bandwidth transactions that are cryptographically signed and validated by smart contract parties. In one or more embodiments, a distributed quantum-classical graph blockchain database(s) can store records, an audit trail and location tracking for patients, software/hardware upgrades, medical/emergency equipment, devices, drugs, medical/emergency equipment calibration records, and/or specification testing. In one or more embodiments, an audit trail of records (e.g., where they were/are, who accessed them, at what locations and times, and/or who updated them) can be securely stored on a distributed quantum-classical graph blockchain database(s).

In one or more embodiments, a distributed quantum-classical graph blockchain database(s) can store smart contract ledgers, network topology, and/or network performance parameters/metrics. In this example, smart contract ledgers can be primitives (e.g., governing contracts) for two-party or multi-party secure allocation, scheduling and management of computation and network resources. As another example, quantum-classical graph blockchain entries can be copied and stored at external entities for auditing, verification, and management.

In one or more embodiments, identity and location can be used to create unique tokens for blockchain execution. For example, a network node(s) can produce a local location token and applications can produce trusted identity tokens. Bandwidth, service priority and other services can be determined by an operator. UEs and UE applications can be assigned bandwidth, service priority and other services by a quantum-classical compute/bandwidth resource controller based on identity and the tokens. If an application violates carrier policy, application priority, services, and access privileges can be revoked. Smart contracts for two-party or multi-party secure allocation, scheduling and management of computation and network resources can be negotiated, stored in blockchains and executed by quantum-classical compute/bandwidth resource controllers on network nodes.

In one or more embodiments, hybrid quantum-classical network overload can be controlled by a quantum-classical compute/bandwidth resource controller(s) applying limits and/or priority to hybrid classical/quantum network traffic. For example, a quantum-classical federated agent can manage reserve stored compute/bandwidth/qubit memory, Superdense coding channel capacity and/or demand.

In one or more embodiments, network traffic based on stored compute/bandwidth capacity and network topology can be shifted by a quantum-classical compute/bandwidth resource controller(s) from low latency channels sharing Bell State pairs (e.g., superdense coding) to alternate path high latency channels.

In one or more embodiments, the creation of dedicated, private capacity within a 5G/6G/NG network or set of networks based on specific characteristics (e.g., high bandwidth, low latency, priority, emergency services) or future needs is provided. As an example, a high throughput video application can have different bandwidth requirements than a low latency haptic application.

In one or more embodiments, the ability to create and manage smart contracts using distributed ledgers and proof of location, and a means to define and discover UE expulsion criteria for quantum/classical bandwidth allocation, service priority violations/anomalies as part of the smart contract, are provided.

In one or more embodiments, a 5G/6G/NG network node(s) produces a local location token and UE applications produce trusted identity tokens. In one or more embodiments, a 5G/6G/NG network operator can determine policy violations/anomalies and can transparently publish them such that bandwidth allocation, service priority, and other factors can be verified with the application owner and selectively terminated for violating policy.

In one or more embodiments, smart contracts can be provided that are executable code that runs on the quantum-classical graph blockchain database. For example, smart contracts execute agreements directly between parties. In one or more embodiments in disaster scenarios, UE devices and/or applications with emergency, high bandwidth, low latency or future needs required for immediate connectivity can quickly and securely request network resources. In one or more embodiments, QML can predict priority uplift based on proof of location and assign network resources.

In one or more embodiments, QML can analyze smart contracts stored on distributed and networked quantum-classical graph blockchain databases for security vulnerabilities and attacks. In one or more embodiments, a quantum-classical graph neural network QML can determine low hybrid classical/quantum network utilization and distribute entangled qubits to network nodes based on node compute/memory/bandwidth capacity and other parameters. Other embodiments are described in the subject disclosure.

One or more aspects of the subject disclosure include a device comprising: a processing system including a processor; and a memory that stores executable instructions that, when executed by the processing system, facilitate performance of operations. The operations can include providing a model to a group of nodes of a network, where the model is associated with determining a configuration of the network for at least one of distribution or usage of qubits. The operations can include receiving, from one or more nodes of the group of nodes, updated model parameters, where the updated model parameters are generated by each of the one or more nodes via training of a local model utilizing the model and local data accessible to the particular node of the one or more nodes resulting in local models, where the device does not receive the local data. The operations can include generating an updated model based on the updated model parameters, where the updated model is associated with determining the configuration of the network for at least one of distribution or usage of qubits. The operations can include storing at least one of the updated model or the updated model parameters in a blockchain database. The operations can include providing the updated model to the group of nodes of the network.

One or more aspects of the subject disclosure include a non-transitory machine-readable medium, comprising executable instructions that, when executed by a processing system including a processor of a network node, facilitate performance of operations. The operations include receiving a model from a global node of a network, the model being associated with determining a configuration of the network for qubits. The operations include obtaining local data associated with a portion of the network that is associated with the network node. The operations include training a local model utilizing the model and the local data. The operations include determining updated model parameters according to the training. The operations include providing the updated model parameters to the global node, where the global node generates an updated model based on the updated model parameters, and where the updated model is associated with determining the configuration of the network for the qubits. The operations include receiving the updated model from the global node.

One or more aspects of the subject disclosure include a method comprising providing, by a global node, a model to a group of nodes of a network, where the model is associated with determining a configuration of the network for qubits. The method includes receiving, by the global node from one or more nodes of the group of nodes, updated model parameters, where the updated model parameters are generated by each of the one or more nodes via training of a local model utilizing the model and local data accessible to the particular node of the one or more nodes resulting in local nodes. The method includes generating, by the global node, an updated model based on the updated model parameters, where the updated model is associated with determining the configuration of the network for the qubits. The method includes providing, by the global node, the updated model to the group of nodes of the network, where the updated model facilitates managing distribution and usage of entangled qubit storage in devices of the network as reserve hybrid quantum-classical network capacity for bandwidth and computing.

Referring now to FIG. 1, a block diagram is shown illustrating an example, non-limiting embodiment of a system 100 in accordance with various aspects described herein. System 100 can include one or more nodes or components 175 (e.g., global and local nodes) that are distributed throughout the network and which can facilitate management of qubit distribution and usage. For example, system 100 via nodes 175 can facilitate in whole or in part providing a model from a global node to a group of nodes of the network where the model is associated with determining a configuration of the network for at least one of distribution or usage of qubits; receiving from one or more nodes of the group of nodes at the global node updated model parameters where the updated model parameters are generated by each of the one or more nodes via training of a local model utilizing the model and local data accessible to the particular node of the one or more nodes resulting in local models and where the global node does not receive the local data; generating an updated model at the global node based on the updated model parameters where the updated model is associated with determining the configuration of the network for qubits (e.g., at least one of distribution or usage of qubits); storing by the global node at least one of the updated model or the updated model parameters in a blockchain database; and providing the updated model to the group of nodes of the network. The model can then be utilized for management of qubits, including distribution, usage, and so forth.

System 100, via nodes 175 or other components of the network, can facilitate management associated with public safety and other global networks. For example, public safety first responders can be provided with a secure, highly-available, low-latency-access communication and network infrastructure (which can include location-based situational awareness), reflecting the overarching public safety community's requirement to respond to the entire spectrum of routine, emergency, and disaster emergency scenarios—both natural and manmade—at a moment's notice. System 100 can address the fact that most disasters occur without warning, and all require a rapid and flawless response with little to no room for error. System 100 facilitates timely, multi-disciplinary, coordinated responses across agency lines which can be mission-critical to protect the communities and citizens public safety first responders are charged to serve. System 100 can provide highly-available, low access-latency networks, real-time data collection, real-time three dimensional (3D) location-based situational awareness, and actionable analytics to facilitate a successful first-responder rapid response. System 100 can provide more efficient communications, computation, and resource usage for various events including a fire, natural disaster (e.g., hurricane, earthquake, forest fire, flood, commercial disaster, and so forth), vehicular collision, search and rescue operation, act of terrorism, or apprehension of suspects.

In one or more embodiments in a wide area disaster or emergency, system 100 can satisfy the large demand for secure 5G/6G/NG network capacity. Currently, during a wide area disaster 5G/6G/NG network traffic often exceeds the available capacity resulting in rationed capacity with priority services and traffic throttling (e.g., overload controls, network management, and other methods employed to limit traffic and protect the network). Communications networks including those designed for first responders have a finite amount of capacity (e.g., bandwidth) that can be exceeded in a disaster. In addition, network capacity may be reduced by damage to network infrastructure from a wide area disaster. System 100 can add to that capacity, such as through use of intelligently distributed entangled qubits, which can alleviate any shortfalls in network capacity and can avoid or reduce rationed capacity, prioritization of services and/or traffic throttling.

In one or more embodiments, system 100, via nodes 175 or other components of the network, can include hybrid quantum-classical networks that transmit and store entangled qubits among other unique quantum network properties. System 100, via nodes 175 or other components of the network, can satisfy the demands of 5G/6G/NG mobile networks that increasingly require quantum and hybrid quantum-classical communications to interconnect a plurality of end-to-end (ETE) quantum and hybrid quantum-classical networked application resources, such as application programs, application programming interfaces (APIs), application servers, security servers, data repositories/lakes, routers, switches, load balancers, links, and so forth.

In one or more embodiments, system 100, via nodes 175 or other components of the network, can store, entangled qubits which serve as reserve hybrid quantum-classical network capacity that is available during wide area disasters, selected events, or other selected situations. In one or more embodiments, system 100, via nodes 175 or other components of the network, can store, entangled qubits which serve as reserve distributed compute capacity.

In one or more embodiments, system 100, via nodes 175 or other components of the network, provide for network entangled qubit compute/memory/bandwidth storage, management, and distribution. The systems and methods described herein can determine and manage the distribution of qubits such as determining what nodes, UEs or other devices that should store such qubits based on various criterion such as traffic, predicted demand, configuration of a network in an emergency (e.g., resiliency such as if nodes are not available, reconfigure, alternate route). The systems and methods described herein can determine distribution points for entangled qubits, what types of distribution to use (e.g., physical, photonic), storage policies and smart contracts. The systems and methods described herein can provide an identity, location and priority authentication process to create unique tokens for bandwidth allocation. The systems and methods described herein can also be utilized with other features such as management and distribution of higher dimension entanglement (qudits) where qudits are a multi-level unit alternative to 2-level qubits, and/or anomaly detection and network security using deep learning to detect patterns in network traffic and other characteristics.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
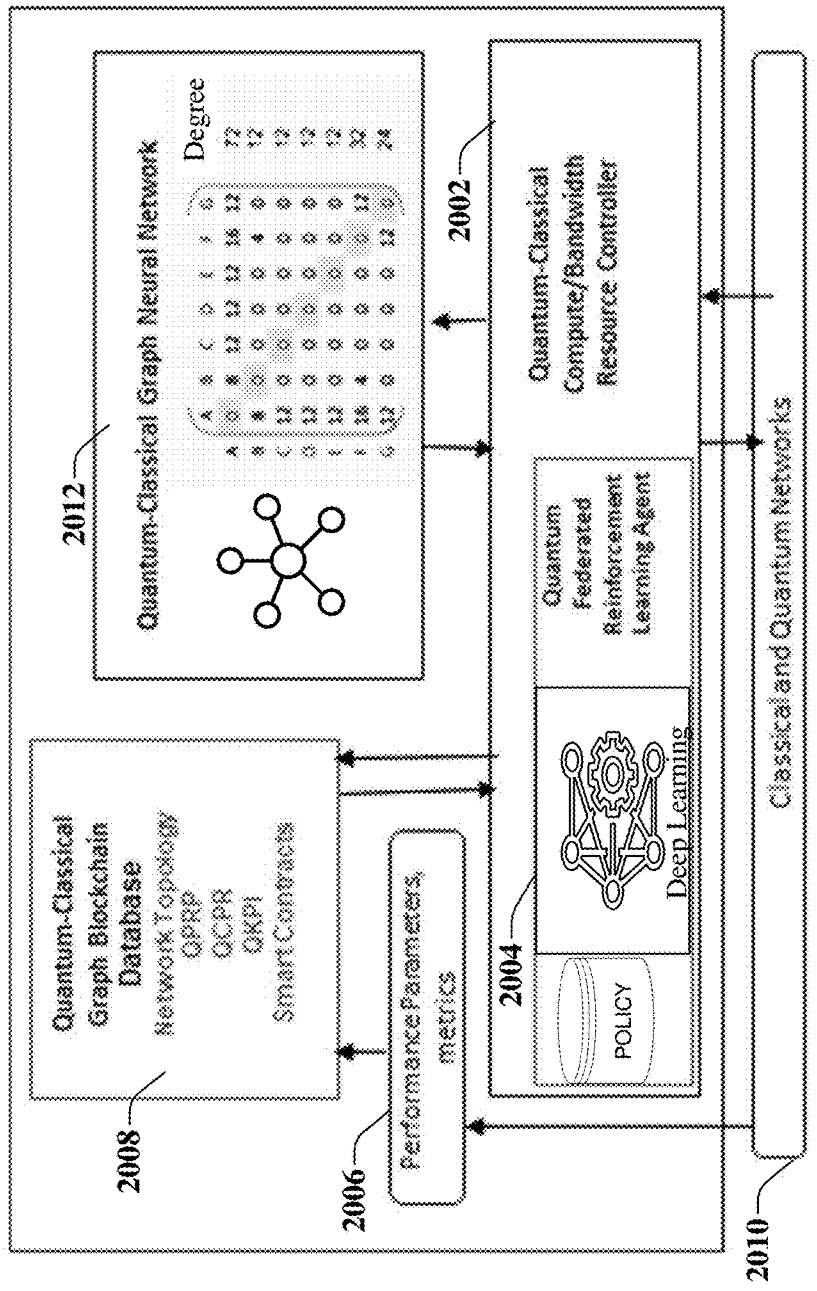
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. System 200 is shown with particular components, however, other components or other numbers of the illustrated or described components can also be utilized, including having a plurality of controllers operating as local and/or global nodes as described herein.

System 200 allows stored, entangled qubits to be utilized for a number of different functions including as a reserve hybrid quantum-classical network and compute capacity which can be made available for various reasons such as during wide area disasters, during scheduled events, when particular network conditions are detected (e.g., outside of a particular threshold), and so forth. In one or more embodiments, system 200 provides for 5G/6G/NG network entangled qubit compute/bandwidth storage, memory management and distribution for a network(s) 2010 (or a portion thereof) which can include classical and quantum networks (and combinations thereof). System 200 can include a network of distributed, quantum-classical compute/bandwidth resource controllers 2002. The resource controller 2002 can be a 5G/6G/NG network node with quantum memory for long-lived storage of entangled qubits, although other types of controllers can also be utilized including hybrid quantum/classic devices and classic computing devices. In one or more embodiments, the quantum memory can be in a specialized node. In one or more embodiments, the resource controller 2002 can perform quantum computation, qubit entanglement distillation and/or quantum error correction. In one or more embodiments, the resource controllers 2002 (only one of which is shown) can be local nodes, global nodes, and/or super-global nodes (e.g., arranged in a hierarchy based on various criteria including geographical regions).

In one or more embodiments, the resource controller 2002 can include superdense coding quantum communications protocols for communicating a number of classical bits of information by only transmitting a smaller number of qubits between controllers and other quantum-classical network elements. As an example, the quantum-classical resource controller can have a network superdense coding optimizer. For instance, the optimizer can be a Quantum-Classical Federated Reinforcement Learning (QFRL) agent 2004.

QFRL agents can explore and learn network dynamics and optimize or improve network resources based on learning. In one or more embodiments, the QFRL agent 2004 executing at the optimizer can determine optimized or improved network qubit distribution/storage/usage configurations more rapidly than classical reinforcement learning agents. In one embodiment, each of the nodes 2002 can include or have access to a QFRL agent 2004, so that local models can be generated based on analysis of local, independent data for each of the nodes.

In one or more embodiments, system 200 can provide quantum-classical federated learning having one or more of the following characteristics: two or more distributed agents jointly building a model to solve a problem; a global agent that combines model updates from local agents; each agent can hold or otherwise manage independent data and can use the independent data for model training; the data held by each agent is not sent to the other agent during model training; the agent learning can be conveyed through model parameters that do not involve privacy; the model can be securely transmitted between parties with the support of an encryption scheme; the original data cannot be inferred even if it is eavesdropped during transmission; the performance of the resulting model can be very close to that of the ideal model established with all data transferred to one centralized party; service models, such as network slicing, can be maintained; a global agent can store global model updates in a blockchain database for transparency and auditability; global updates can be made available for review, modification, and/or approval by human operators before, during and/or after model updates are sent to local agents.

In one or more embodiments, one or more controllers 2002 can execute a quantum-classical federated agent that makes decisions on qubit distribution, qubit storage and/or qubit usage configurations whereby there is a reward function for optimal configurations. For instance, the agent can weigh cost based on various criterion such as bandwidth storage, time, distance, latency, and other parameters to predict an optimal plan. In one embodiment, a trajectory in Reinforcement Learning (RL) can be a sequence of what has happened (e.g., in terms of state, action, reward) of a set of contiguous timestamps from a single part of a continuous problem such as given {State $St_1$, Action $At_1$, and Reward $Rt_1$} at time t 1 the agent transitions to {State $St_2$, Action $At_2$, and Reward $Rt_2$} at time $t_2$. Other RL model inputs can also be utilized including initial bandwidth, time, distance, latency, and other weights.

System 200 can utilize various types and numbers of databases 2008 to facilitate management of the qubits, including corresponding databases for each of the nodes 2002. For example, a quantum blockchain can be utilized that is a decentralized, encrypted and distributed database based on quantum computation and quantum information theory. In a classical blockchain, the communication and trust between nodes relies on digital signal technology but the security of this digital signal technology may be based on the assumption of computational complexity for certain mathematical problems. Database 2008 can employ quantum computation and quantum algorithms with improved efficiency, such as Shor's quantum search algorithm or derivatives thereof or other quantum algorithms, which can solve integer factorization in polynomial time. In one or more embodiments, database 2008, through use of quantum computers, can solve some NP-hard problems much faster than classical computers. However, as explained herein, database 2008 can also include hybrid quantum/classical, classical and/or quantum only computers.

In one or more embodiments, database 2008 can employ quantum blockchains which are a combination of quantum technology and blockchain technology that provide increased security and efficiency; where security between quantum blockchain nodes can be guaranteed by the properties of quantum physics; where a quantum blockchain, by the quantum entanglement principal, is resistant to modification; and where the efficiency of quantum blockchains can be based on faster processing speeds for quantum technology. In one or more embodiments, a Quantum Digital Signature (QDS) can be used to verify the owner of a network resource; where the QDS is similar to, or the quantum equivalent of, a digital signature with asymmetric keys; and where a QDS can use either a public quantum-bit key with a private classical bit string or a private quantum bit string.

In one or more embodiments, information 2006, such as quantum-classical network data (e.g., network topology, tunable performance parameters and other data), can be stored in database 2008 which includes a quantum-classical graph blockchain database. For example, the quantum-classical graph blockchain database 2008 can utilize graph structures for semantic queries with nodes, edges and properties to represent and store data; where nodes in the network are represented as nodes in the quantum-classical graph blockchain database; and where network connections are represented as edges in the graph database.

In one or more embodiments, system 200 utilizes a graph database 2008 which can efficiently represent network topologies; where querying relationships within the graph database is a rapid process because the querying relationships can be perpetually stored within the database itself (e.g., the structure of the database models the network topology). In one or more embodiments, system 200 facilitates using blockchains which are distributed in secure databases that store data in a ledger, where the graph blockchain has lower latency and compute requirements. In one or more embodiments, system 200 utilizes a graph blockchain database 2008 which is hybrid quantum-classical in nature because some operations and optimization may be performed on a classical computer.

In one or more embodiments, system 200 employs any number of Graph Neural Network(s) 2012 (GNNs) (including an embodiment of corresponding GNNs for each of the nodes 2002), which utilize graph structure and node features to learn the representation of nodes, edges, and graphs. As an example, system 200 can utilize a quantum-classical GNN 2012 which would represent a network as a graph. In one or more embodiments, graphs can be represented as matrices (adjacency, incidence, and so forth) which fits well with deep learning matrix calculus.

In one or more embodiments, system 200 can satisfy situations where a certain emergency comes without warning, such as with a vehicle accident or an earthquake, and the public safety response is reactive and the goal is preparation to deploy assets as soon as possible. In one or more embodiments, system 200 can satisfy situations where for certain emergencies assets can be deployed in anticipation of a predicted event: hurricanes, snowstorms, and downstream flooding often allow for days of preparation; and some circumstances, such as an armed confrontation or build-up towards war, may allow weeks for deployment of assets.

In one or more embodiments, system 200 allows (e.g., during public safety incidents) first responders, public safety entities (PSEs), and/or public safety agencies (PSAs) to continually track and intercommunicate to ensure a coordinated incident response resulting in better outcomes. In one or more embodiments, system 200 allows location of first responders to be better tracked, including for example, while in vehicles, on a foot chase, involved in search-and-rescue operations, fighting wildfires, restoring communications in the wake of a flood or earthquake, or inside a high-rise building responding to an incident. Various techniques and components can be employed by system 200 (in place of and/or in conjunction with techniques and components described with respect to system 200 and other embodiments described herein) to facilitate management of public safety data, such as components and/or functions described in U.S. Pat. No. 10,244,581 filed May 19, 2017 and entitled "Public Safety Analytics Gateway", the disclosure of which is hereby incorporated herein by reference.

In one or more embodiments, system 200 can satisfy a large demand for 5G/6G/NG network capacity in a wide area disaster or emergency that exceeds engineered network capacity and/or where the network capacity has been reduced by damage to network infrastructure from the wide area disaster. In one or more embodiments, system 200 can satisfy changing demand for 5G/6G/NG network capacity in a wide area disaster or emergency where capacity demand locations or geographic areas change based on conditions, time of day, etc. such as in a fire, flooding, and so forth. In one or more embodiments, the distribution of qubits can be performed at efficient times, such as during low network traffic times. In one or more embodiments, local models can be trained during emergency events (or other abnormal events) and/or can be trained outside of emergency events (or other abnormal events). In one or more embodiments, local models can be trained during various traffic conditions including high traffic periods and/or low traffic periods. In one or more embodiments, only a subset of local models is trained during emergency events and/or various traffic conditions (e.g., high traffic periods and/or low traffic periods).

In one or more embodiments, IoT data can be utilized for training local models where the IoT data is not sent to the global node but rather updated model parameters are sent from the local nodes to the global node. In one or more embodiments, other network management techniques can be utilized in conjunction with the management of distribution and/or usage of qubits, such as increasing bandwidth via classical communications. In one or more embodiments, configuration changes of a network can be monitored, such as removing or adding nodes or network elements, adding capacity between nodes, and so forth, and considered as a factor in the management of distribution and/or usage of qubits.

In one or more embodiments, Explainable Quantum Machine Learning (XQML) can be employed with the management of distribution and/or usage of qubits. In one or more embodiments, the management of distribution and/or usage of qubits can include changing the distribution (e.g., positioning) and/or usage of qubits over time as circumstances change, such as the network growing in one area but not in another area. In one or more embodiments, training of a local model by a first local node that takes into account a particular abnormal event(s) and/or particular abnormal condition(s) can be utilized by the global node (which receives updated parameters that were derived through machine learning by the first local node based on the particular abnormal event(s) and/or particular abnormal condition(s)) in generating the updated model such that if a second local node were to encounter a similar or same particular abnormal event(s) and/or particular abnormal condition(s) then the updated model would allow the second local node to correctly address the particular abnormal event(s) and/or particular abnormal condition(s), including optimizing the management of distribution and/or usage of qubits before, during, and/or after the particular abnormal event(s) and/or particular abnormal condition(s). In one or more embodiments, various network management optimization algorithms can be employed, such as U.S. application Ser. No. 17/813,848 entitled "Network Optimization For Hybrid Quantum-Classical Networks" filed Jul. 20, 2022, the disclosure of which is hereby incorporated by reference.

Figure 2B:
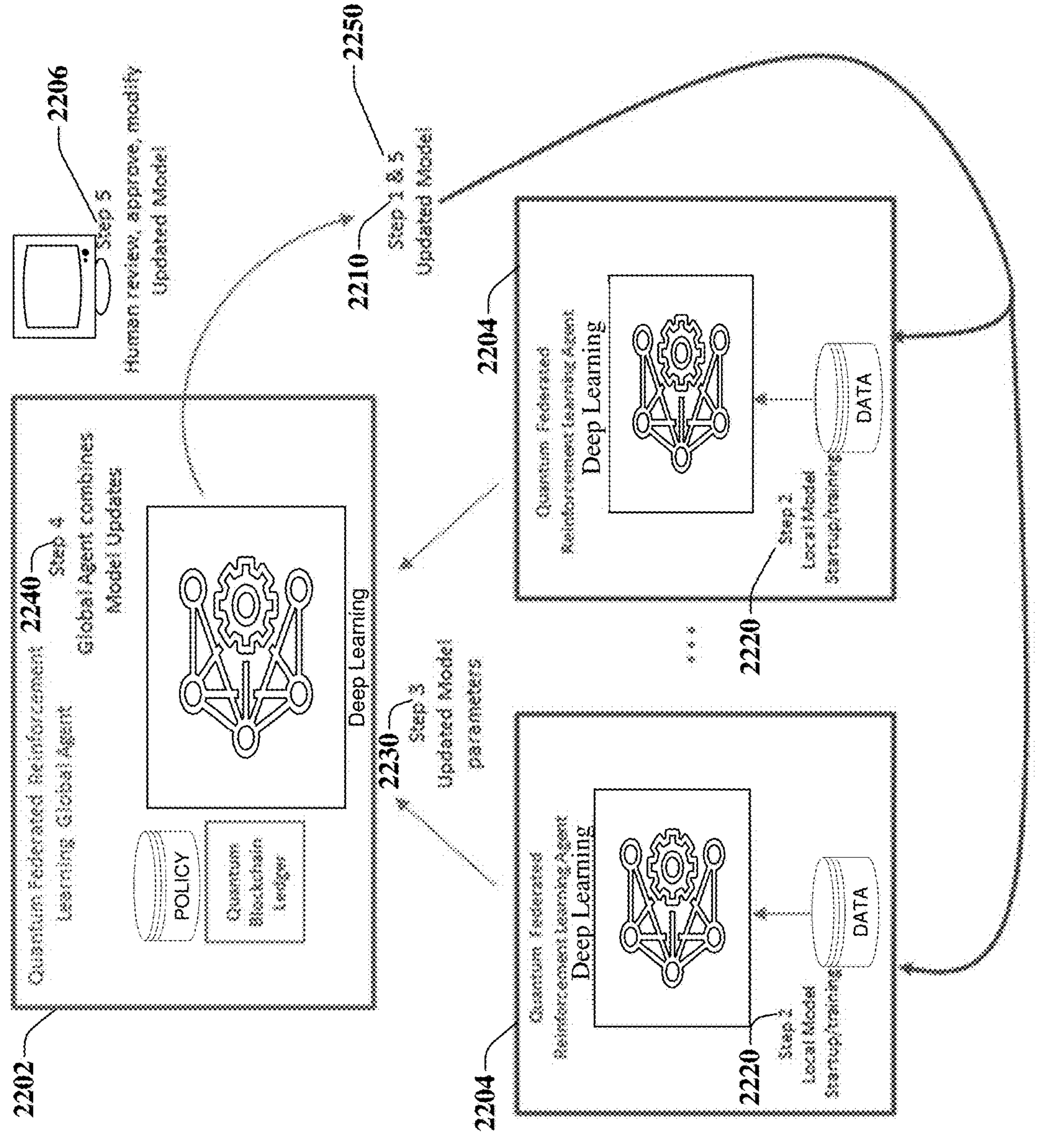
FIG. 2B is a block diagram illustrating an example, non-limiting embodiment of a system functioning within the communication network of FIG. 1 in accordance with various aspects described herein.

FIG. 2B is a block diagram illustrating an example, non-limiting embodiment of a system 220 with data flow and functions that can operate within the communication network of FIG. 1 in accordance with various aspects described herein, including in conjunction with system 200 and/or via devices 175. System 220 includes functions performed by quantum federated reinforcement learning agents 2204 (only two of which is shown) to update the global agent 2202. Various configurations of system 200 can be utilized including any number of local agents 2204 (e.g., each local agent corresponding to a geographical area, a service type or other criterion), any number of global agents 2202 (e.g., a single global agent or multiple global agents that each correspond to groups of geographic area such as regions of a country where a super-global coordinator/agent can operate above the global agents in a hierarchy).

At 2210, an updated or initial model can be sent from the global agent 2202 to the local agents 2204. At 2220, each local agent 2204 can start up and train a local model (e.g., based on the received model from the global agent and based on local data that is collected or accessed by the local agent). At 2230, the local agents can send updated model parameters to the global agent (which may be sent without sending the local data and/or which can be sent at different times). At 2240, the global agent combines model updates (e.g., utilizing an aggregating algorithm) and stores the updates in a blockchain database. At 2250, the global agent 2202 can send an updated model (e.g., generated based on the updated model parameters) to the local agents 2204.

In one or more embodiments, global model updates can be stored in a blockchain database to provide transparency, auditability, human modification, and explainability of the global model and model changes, such as through use of computing equipment 2206. As an example, global updates can be available for review, approval, and/or modification by human operators before, during and/or after model updates are sent to local agents 2204. System 220 promotes explainability and can employ explainable machine learning to enhance public safety trust and confidence in QMRL systems.

In one or more embodiments, system 220 can employ quantum computing of graph adjacency matrices which is inherently more time- and space-efficient than classical computation. In this example, the quantum-classical neural network model can run until an approximate optimal distributed, entangled qubit configuration is reached. Other criteria for executing the model and finding a solution can also be utilized which may or may not find an optimal solution (e.g., ceasing execution after a threshold amount of time or iterations, etc.).

In one or more embodiments, system 220 can deploy quantum/classical networks utilizing an overlay of quantum network elements and classical network elements where elements may be hybrid quantum/classical, classical and/or quantum only. In one or more embodiments, system 220 can utilize quantum computing elements that are separate, adjunct to or otherwise accessible by some or each of the resource controllers of the nodes 2202, 2204.

In one or more embodiments, system 220 can provide a distributed quantum-classical graph blockchain database(s) that utilize graph structures for semantic queries with nodes, edges, and/or properties to represent and store data; whereby nodes in the network are represented as nodes in the distributed quantum-classical graph blockchain database; whereby network connections are represented as edges in the graph database. In one or more embodiments, system 220 can provide a distributed quantum-classical graph blockchain database which stores smart contract ledgers, network topology, and/or network performance parameters/metrics; whereby smart contract ledgers can be of various types including primitives (e.g., governing contracts) for two-party or multi-party secure allocation, scheduling and/or management of computation and/or network resources. Various techniques and components can be employed by system 220 (in place of and/or in conjunction with techniques and components described with respect to system 220 and other embodiments described herein) to facilitate management of network slicing and/or ledgers, such as components and/or functions described in U.S. Pat. No. 10,965,777 filed Jul. 23, 2019 and entitled "Application Management of Network Slices with Ledgers", the disclosure of which is hereby incorporated herein by reference.

In one or more embodiments, system 220 allows quantum-classical graph blockchain entries to be copied and stored at external entities for auditing, verification, and management. In one or more embodiments, system 220 allows identity and location (e.g., of devices) to be used to create unique tokens for blockchain execution. For instance, a network node can generate a local location token while applications can generate trusted identity tokens. In one or more embodiments, system 220 allows bandwidth allocation, user priority and other network operational parameters to be determined and/or confirmed by an operator. In this example, if an application violates policies application priority can be revoked.

In one or more embodiments, system 220 can utilize a distributed quantum-classical graph neural network to estimate network capacity metrics (e.g., end-to-end metrics) for a network topology, routing, traffic measurements, qubit memory, and/or optimal qubit bandwidth storage of the network. In this example, normalized Quantum Key Performance Indicators (QKPIs) for a target network, along with QKPIs from networks with similar topology and performance metrics, can be utilized as model training data for the quantum-classical neural network. Continuing with this example, the represented network nodes, edges, graphs, parameters, and/or weights can be inputs to the quantum-classical neural network model.

Figure 2C:
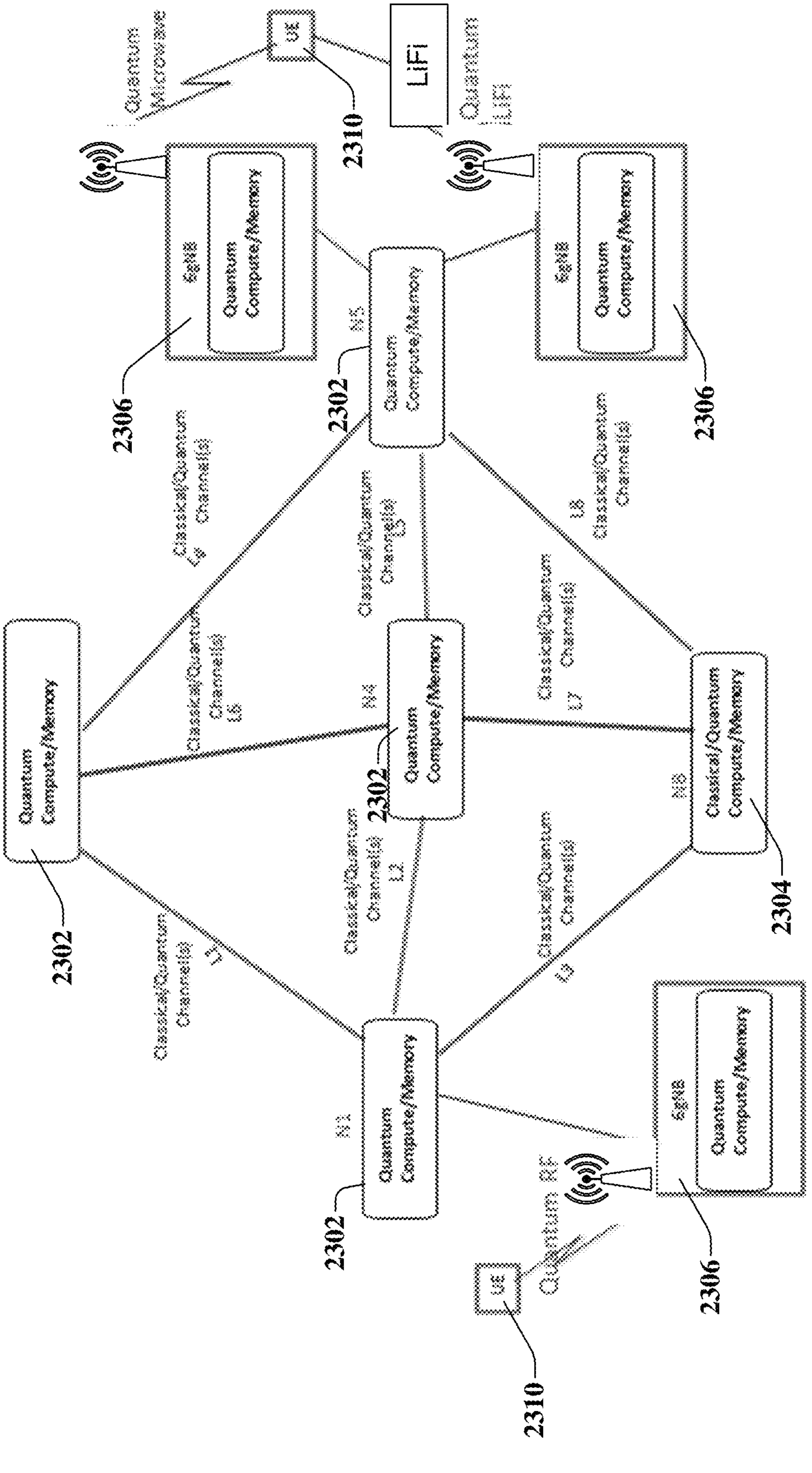
FIG. 2C is a block diagram illustrating an example, non-limiting embodiment of a system functioning within the communication network of FIG. 1 in accordance with various aspects described herein.

FIG. 2C is a block diagram illustrating an example, non-limiting embodiment of a system 230 functioning within the communication network of FIG. 1 in accordance with various aspects described herein, including in conjunction with system 200 and/or via devices 175. In one or more embodiments, system 230 provides a quantum and hybrid quantum-classical communications network whereby 5G/6G/Next-G gNBs 2306 with quantum RF, quantum Microwave and/or quantum LiFi (e.g., optical wireless communications or other celestial (wireless and/or satellite)/terrestrial techniques such as IR) can communicate with 5G/6G/Next-G UEs 2310 and/or 5G/6G/Next-G UE applications. Various nodes are utilized in the system 230 including quantum nodes 2302 and hybrid classical/quantum nodes 2304. Various channels are established between the nodes including classical/quantum channels L1-L8. It should be understood that other communication techniques can be utilized in system 230 including other optical wireless communications or other celestial (e.g., wireless and/or satellite) and/or terrestrial techniques such as IR, in addition to or in place of the LiFi connection(s).

System 230 can provide for managing network (e.g., 5G, 6G, NG) entangled qubit compute/memory/bandwidth storage, management, and distribution as described herein. System 230 can manage the distribution (e.g., positioning at various network elements) of qubits (e.g., nodes and/or UEs to distribute to in a network) based on various criteria such as traffic, predicted demand, configuration of a network in an emergency (e.g., resiliency such as if nodes are not available, reconfigure, alternate route) utilizing various techniques including machine learning, such as federated reinforcement learning (which may or may not utilize quantum computing), although other machine learning techniques can also be employed. System 230 can determine distribution points for entangled qubits, what types of distribution to use (e.g., physical, photonic, and so forth), storage policies and/or smart contracts. System 230 can provide an identity, location and priority authentication process to create unique tokens for bandwidth allocation.

Figure 2D:
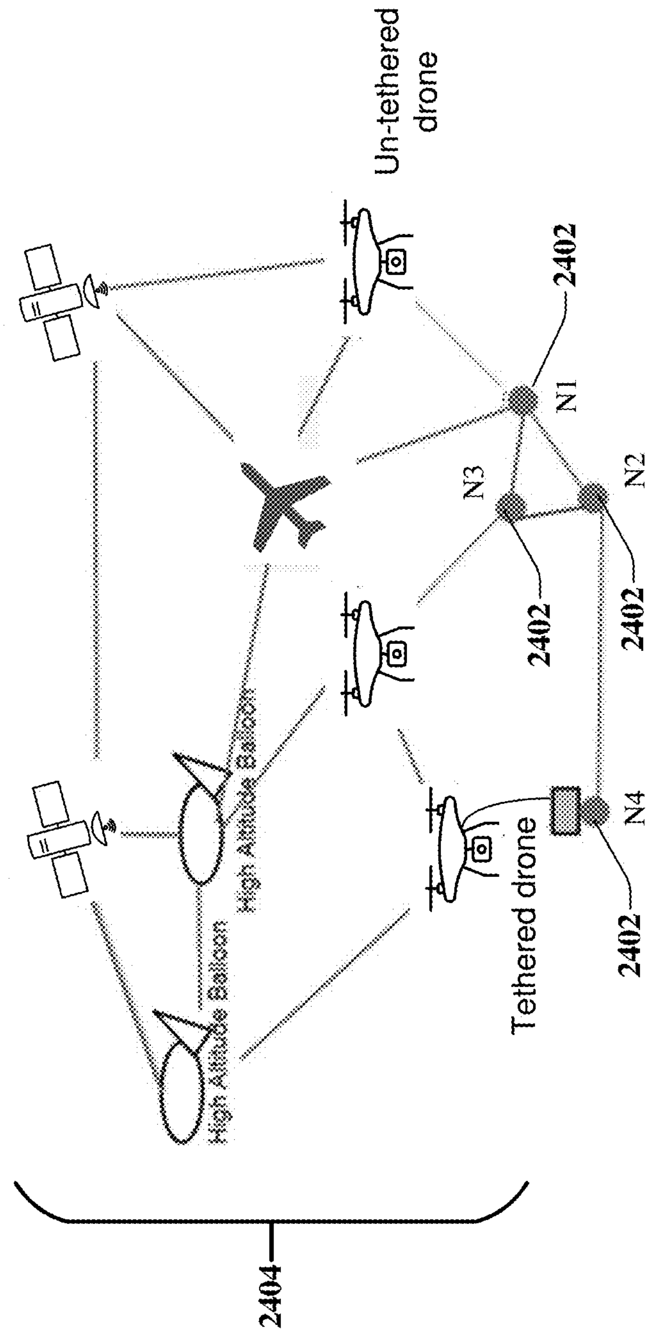
FIG. 2D is a block diagram illustrating an example, non-limiting embodiment of a system functioning within the communication network of FIG. 1 in accordance with various aspects described herein.

FIG. 2D is a block diagram illustrating an example, non-limiting embodiment of a system 240 functioning within the communication network of FIG. 1 in accordance with various aspects described herein, including in conjunction with system 200 and/or via devices 175. System 240 can provide a quantum and hybrid quantum-classical multi-altitude communications network, enabling relaying nodes, and communications channels between and among a plurality of aerial devices or satellites 2404 (e.g., GEO, MEO, LEO, high-altitude balloons, un-tethered drones, tethered drones, aircraft, UEs, and so forth). These devices 2404 can already be in operation and/or can be deployed as circumstances dictate, such as deploying aerial nodes where a forest fire exists. The distribution of qubits can be selected among the aerial devices 2402 and other network equipment already in the infrastructure. In one embodiment, nodes 2402, which can include local, global, and/or super-global nodes, can be utilized for management of distribution and/or utilization of qubits as described herein. For example, a priori distribution, storage and management of entangled qubits at some or each node 2402 and/or 2404 can be managed by distributed and networked quantum-classical compute/bandwidth resource controllers operating at nodes 2402 and/or utilizing quantum-classical graph blockchain databases.

Figure 2E:
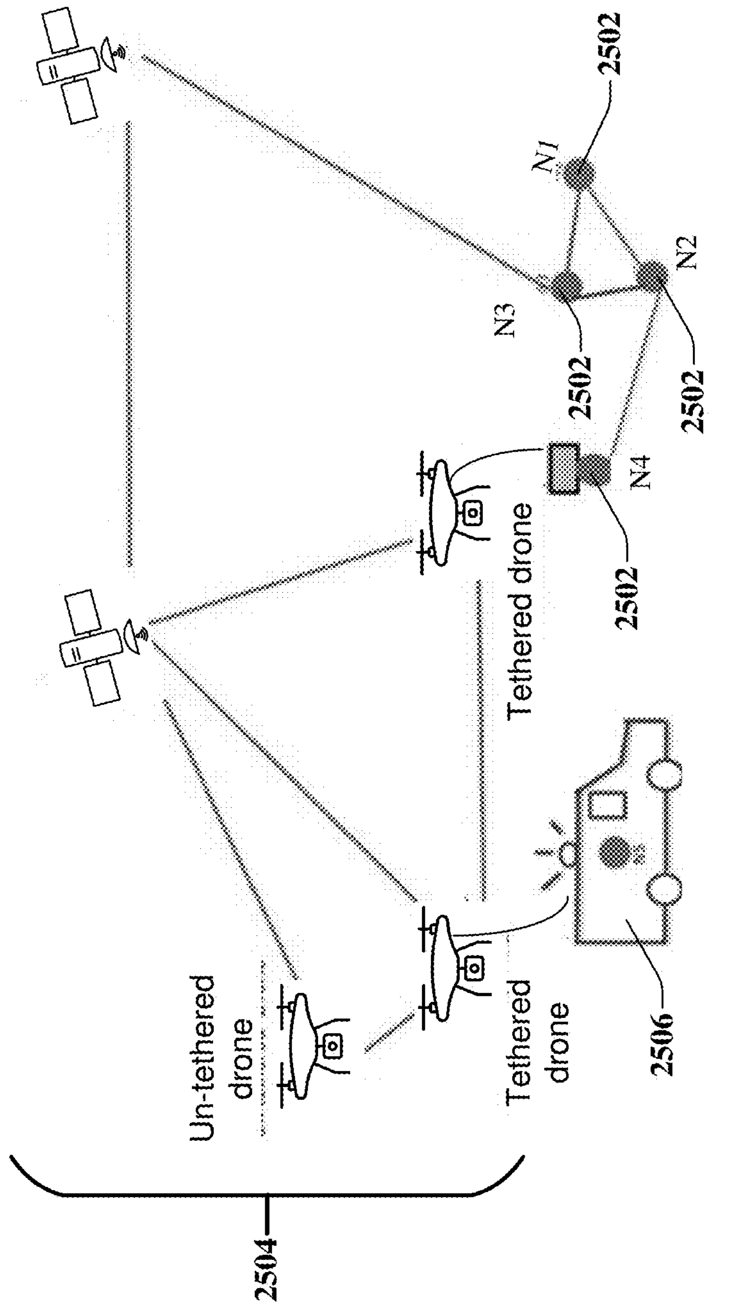
FIG. 2E is a block diagram illustrating an example, non-limiting embodiment of a system functioning within the communication network of FIG. 1 in accordance with various aspects described herein.

FIG. 2E is a block diagram illustrating an example, non-limiting embodiment of a system 250 functioning within the communication network of FIG. 1 in accordance with various aspects described herein, including in conjunction with system 200 and/or via devices 175. In one or more embodiments, system 250 can provide a quantum and hybrid quantum-classical communications network that can include self-navigating vehicles 2506 along with aerial devices 2504 such as tethered and un-tethered drones deployed to public safety incidents to facilitate communication for first responders in the area or to be employed where and when an area is deemed not safe for first responders. In one embodiment, nodes 2502, which can include local, global, and/or super-global nodes, can be utilized for management of distribution and/or utilization of qubits as described herein. For example, a priori distribution, storage, and management of entangled qubits at each node can be managed by distributed and networked distributed quantum-classical compute/bandwidth resource controllers operating at nodes 2502 and/or utilizing quantum-classical graph blockchain databases. Other network elements, such as satellites, fixed resources, and so forth, can be utilized in conjunction with the self-navigating vehicles 2506 and/or the aerial devices 2504.

Figure 2G:
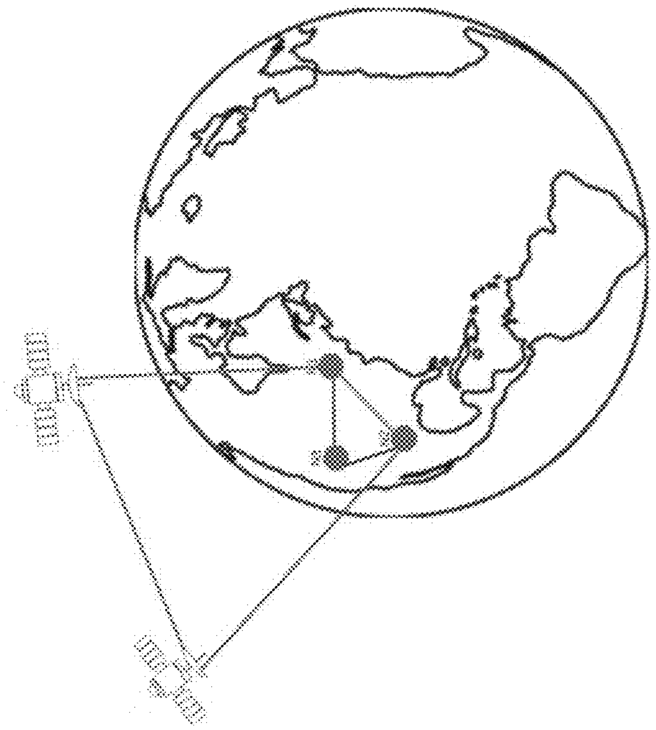
FIG. 2G is a block diagram illustrating an example, non-limiting embodiment of a system functioning within the communication network of FIG. 1 in accordance with various aspects described herein.
Figure 2F:
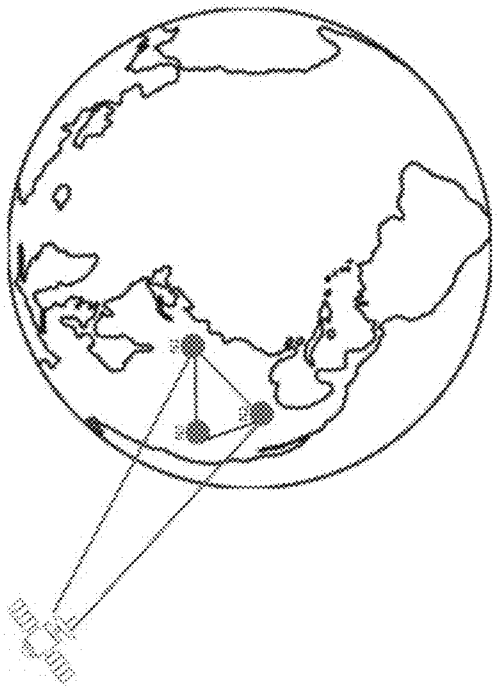
FIG. 2F is a block diagram illustrating an example, non-limiting embodiment of a system functioning within the communication network of FIG. 1 in accordance with various aspects described herein.

FIGS. 2F and 2G are block diagrams illustrating example, non-limiting embodiment of systems 280 and 285 functioning within the communication network of FIG. 1 in accordance with various aspects described herein, including in conjunction with system 200 and/or via devices 175. In one or more embodiments in FIG. 2F, system 280 can provide a quantum and hybrid quantum-classical communications network that can utilize a single satellite supporting multiple nodes. In one embodiment, nodes, which can include local, global, and/or super-global nodes, can be utilized for management of distribution and/or utilization of qubits as described herein. For example, a priori distribution, storage, and management of entangled qubits at each node can be managed by distributed and networked distributed quantum-classical compute/bandwidth resource controllers operating at the nodes and/or utilizing quantum-classical graph blockchain databases. Other network elements, such as aerial devices, unmanned vehicles, fixed resources, and so forth, can also be utilized.

In one or more embodiments in FIG. 2G, system 285 can provide a quantum and hybrid quantum-classical communications network that can include multiple satellites (only two of which are shown) supporting multiple nodes. In one embodiment, nodes, which can include local, global, and/or super-global nodes, can be utilized for management of distribution and/or utilization of qubits as described herein. For example, a priori distribution, storage, and management of entangled qubits at each node can be managed by distributed and networked distributed quantum-classical compute/bandwidth resource controllers operating at the nodes and/or utilizing quantum-classical graph blockchain databases. Other network elements, such as aerial devices, unmanned vehicles, fixed resources, and so forth, can also be utilized.

Figure 2H:
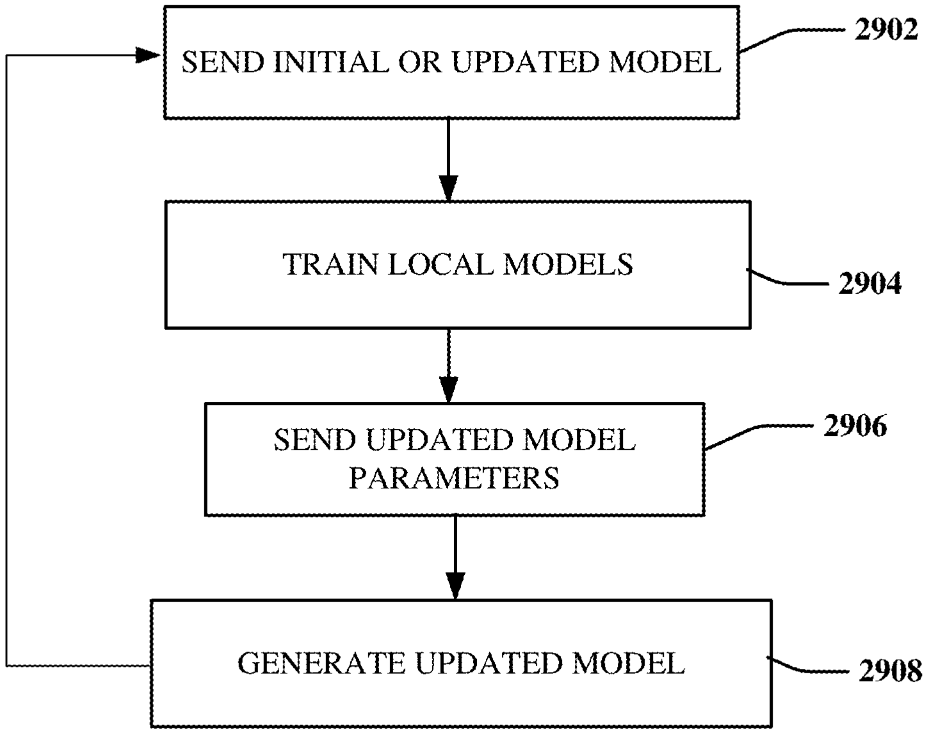
FIG. 2H depicts an illustrative embodiment of a method in accordance with various aspects described herein.

FIG. 2H depicts an illustrative embodiment of a method 290 in accordance with various aspects described herein including in conjunction with system 200 and/or via devices 175. At 2902, a model can be sent from a global node to a group of local nodes of a network. The model can predict or otherwise determine a configuration of the network for qubits (e.g., distribution and/or usage of qubits). At 2904, each of the local nodes can train a local model utilizing the model and local data accessible to the particular node resulting in local models. At 2906, the local nodes can provide updated model parameters to the global node. In one or more embodiments, the local nodes do not send the local data to the global node. At 2908, an updated model can be generated by the global node based on the updated model parameters, where the updated model can be utilized for determining the configuration of the network for qubits (e.g., distribution and/or usage of qubits). In one or more embodiments, the updated model and/or the updated model parameters can be stored in a blockchain database such as by the global node and/or one, some or all of the local nodes. The updated model can be provided by the global node to the group of nodes of the network so that method 290 can be repeated or otherwise continued.

In one or more embodiments, the determining the configuration of the network can include determining network devices for distribution of entangled qubits of the qubits. In one or more embodiments, at least a portion of the entangled qubits of the network devices can operate as reserve distributed compute capacity that is accessible when an event threshold is satisfied. In one or more embodiments, one or more of the local models employ quantum federated reinforcement learning. In one or more embodiments, one or more of the local models employ quantum computing of graph adjacency matrices. In one or more embodiments, the local data of each node is not shared with other nodes. In one or more embodiments, a quantum-classical graph blockchain database stores one of smart contract ledgers, network topology, network performance parameters or a combination thereof, which is accessible to a first node of the group of nodes. In one or more embodiments, at least one of the updated model or the local models employs quantum-classical graph neural network to estimate network capacity metrics for a network topology, routing, traffic measurements, qubit memory, and optimized qubit bandwidth storage of the network, where normalized Quantum Key Performance Indicators (QKPIs) for a target network and QKPIs from other networks with selected topology and performance metrics are utilized as model training data for the quantum-classical graph neural network. In one or more embodiments, superdense coding quantum communications protocols can be implemented for communicating classical bits of information by only transmitting a smaller number of qubits between the device and a quantum-classical network element. In one or more embodiments, the local data includes bandwidth storage, time, distance, and latency, and where the model and the updated model employs Explainable Machine Learning. In one or more embodiments, one or more nodes produce local location tokens and UE applications produce trusted identity tokens. In one or more embodiments, a determination of a configuration of the network can include adjusting network traffic based on stored capacity and network topology between low latency channels sharing Bell State pairs and alternate path high latency channels. In one or more embodiments, a determination of a configuration of the network comprises identifying one of network elements, aerial devices, user devices or a combination thereof that can operate as network devices for distribution of entangled qubits.

While for purposes of simplicity of explanation, the respective processes are shown and described as a series of blocks in FIG. 2H, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In one or more embodiments, video/voice/images/holographic/smart contracts/software content and/or other services can be proactively delivered, managed, and/or stored (e.g., cached) in distributed network edge nodes during favorable network conditions (e.g., low traffic volume, higher bandwidth, high quality channels) to avoid network congestion.

In one or more embodiments, an event threshold (e.g., identifying a particular disaster in a geographic zone, determining a particular type of event in a geographic zone, determining a network performance parameter(s) is not being satisfied, and so forth) can trigger using reserve capacity provided by the entangled qubits that have been selectively distributed or otherwise positioned throughout the network.

In one or more embodiments, a service provider can provide network compute/bandwidth storage capabilities across an entire range of enterprise sectors and public safety since a worldwide carrier is uniquely positioned to distribute, store and manage bandwidth as applied to a plurality of enterprise use cases and public safety.

In one or more embodiments, a service provider can develop a plurality of products and service offerings that would take advantage of compute/bandwidth storage functionality operating within 5G, 6G, or other next-generation mobile networks. In one or more embodiments, compute/bandwidth storage products and services offerings can be provided within the context of highly-integrated satellite and terrestrial compute and networking solutions.

In one or more embodiments, the systems and methods described herein (e.g., systems/methods 200, 220, 230, 250, 280, 285, and 290) can utilize (in addition to or in place of the components and functions described herein) quantum data generated by quantum and hybrid quantum-classical computational runtime environments that are characterized by quantum superposition and quantum entanglement, and yield n-dimensional probability distributions that require exponential compute resources to process, represent, store, and connect. In one or more embodiments, the systems and methods described herein (e.g., systems/methods 200, 220, 230, 250, 280, 285, and 290) can utilize (in addition to or in place of the components and functions described herein) quantum/hybrid quantum-classical ETE networked application resources and can incorporate Quantum Positioning System (QPS), Quantum Artificial Intelligence (QAI), Quantum Machine Learning (QML), Quantum Deep Learning (QDL), Quantum Reinforcement Learning (QRL), and quantum blockchains within 5G/6G/NG mobile and fixed communications networks. Various techniques and components can be employed by the systems and methods described herein (e.g., systems/methods 200, 220, 230, 250, 280, 285, and 290), which can be in place of and/or in conjunction with techniques and components described herein, to facilitate managing blockchains or other databases and/or managing network (e.g., 5G, 6G, NG) entangled qubit compute/memory/bandwidth storage, management, and distribution, such as components and/or functions described in U.S. application Ser. No. 17/498,229 filed Oct. 11, 2021 and entitled "System and Method for Managing Communication Networks with Quantum Blockchains" and components and/or functions described in U.S. application Ser. No. 17/498,248 filed Oct. 11, 2021 and entitled "Quantum Artificial Intelligence and Machine Learning in a Next Generation Mobile Network", the disclosures of both of which are hereby incorporated herein by reference.

In one or more embodiments, the systems and methods described herein (e.g., systems/methods 200, 220, 230, 250, 280, 285, and 290) can provide for continuing cost-performance improvements in classical (non-quantum) processor memory, speed, and very large-scale integration (VLSI) substrate density packing.

In one or more embodiments, the systems and methods described herein (e.g., systems/methods 200, 220, 230, 250, 280, 285, and 290) can utilize (in addition to or in place of the components and functions described herein) quantum computation which stores information as quantum bits (qubits) that are quantum generalizations of classical bits; where the qubits can be represented as a two-to-n-level quantum system (e.g., based on electronic/photonic spin and polarization; where the state of the qubit is a phase vector $|\psi\rangle$ (mathematical description of a quantum system, a complex-valued probability amplitude and the probabilities for possible results of measurements made on the system) in a linear superposition of states such as $|\psi\rangle=\alpha|0\rangle+\beta|1\rangle$; where state vectors $|0\rangle$ and $|1\rangle$ are physical eigenstates of the logical observable, and form a computational basis spanning a two-to-n dimensional Hilbert space (inner product space of two or more vectors, equal to the vector inner product between two or more matrix representations of those vectors) containing $|\psi\rangle$; and where a collection of qubits comprises a multi-particle quantum system.

In one or more embodiments, the systems and methods described herein (e.g., systems/methods 200, 220, 230, 250, 280, 285, and 290) can utilize (in addition to or in place of the components and functions described herein) quantum computation which can: pursue all computational trajectories simultaneously based on quantum superposition (whereas classical computation proceeds in serial fashion); utilize quantum logic gates forming basic quantum circuits that operate on qubits, are reversible with few exceptions (unlike classical logic gates), and are unitary operators, described as unitary matrices relative to basis states.

In one or more embodiments, the systems and methods described herein (e.g., systems/methods 200, 220, 230, 250, 280, 285, and 290) can utilize (in addition to or in place of the components and functions described herein) quantum techniques where the quantum computational speedup relative to classical (non-quantum) computing/networking derives in part from invocation of quantum processing algorithms, for example, Grover's quantum factoring, Shor's quantum search, and/or Routt's quantum search/quantum cryptosystem algorithms. In one or more embodiments, the systems and methods described herein (e.g., systems/methods 200, 220, 230, 250, 280, 285, and 290) can utilize (in addition to or in place of the components and functions described herein) quantum algorithms which utilize quantum circuit gates to manipulate states of quantum systems as compared to classical algorithms which utilize classical logical gates (represented as a sequence of Boolean gates) to perform classical (non-quantum) computational operations.

In one or more embodiments, the systems and methods described herein (e.g., systems/methods 200, 220, 230, 250, 280, 285, and 290) can utilize (in addition to or in place of the components and functions described herein) quantum communication channels that transmit qubits between physically distinct quantum or hybrid quantum-classical processors able to perform quantum logic operations on qubits; where entangled qubits are a resource for hybrid quantum/classical communications network operations that can be performed faster and more securely than with classical only networks; and where entangled qubits can be pre-shared between network nodes.

In one or more embodiments, the systems and methods described herein (e.g., systems/methods 200, 220, 230, 250, 280, 285, and 290) can utilize (in addition to or in place of the components and functions described herein) superdense coding which includes a quantum communications protocol for communicating a number of classical bits of information by only transmitting a smaller number of qubits; where superdense coding assumes pre-shared entangled qubits. In this example, if the sender's qubit is maximally entangled (Bell pair) with a qubit in the receiver's possession, then superdense coding increases the maximum rate to two bits per qubit. Higher dimension superdense coding can also be utilized which is more powerful and can increase channel capacity beyond the two bits per qubit rate.

In one or more embodiments, the systems and methods described herein (e.g., systems/methods 200, 220, 230, 250, 280, 285, and 290) can utilize (in addition to or in place of the components and functions described herein) reinforcement learning that focuses on the interaction of individual agents (e.g., controllers 2002 operating as local nodes) with their environment and maximizing rewards. For example, agents can learn to improve their behavior through trial and error whereby agents take actions using a set of policies to explore the environment based on rewards; and whereby this exemplary process would not learn from pre-provided samples, but rather generate samples to learn for a specific target. As an example of reinforcement learning that can be employed: agents can improve their behavior by interacting with an environment via a series of actions to the environment using a set of policies; the process can have different time steps in which the interaction occurs; agent actions result in a state change; agents can take actions by assessing the environment, making decisions, and taking certain actions imposed on the environment; the environment will provide the agent with a state of the current environment and a reward representing an assessment of the action. Continuing with this example, the results of the reinforcement learning policy which gives agents the action that should be taken for each state whereby policy represents the probability of taking a particular action in a particular state.

In one or more embodiments, the systems and methods described herein (e.g., systems/methods 200, 220, 230, 250, 280, 285, and 290) can utilize (in addition to or in place of the components and functions described herein) reinforcement learning which employs one or more of different categories of algorithms including value-based (actor only), policy-based (critic only); and/or actor-critic.

In one or more embodiments, the systems and methods described herein (e.g., systems/methods 200, 220, 230, 250, 280, 285, and 290) can utilize (in addition to or in place of the components and functions described herein) reinforcement learning which employs federated reinforcement learning that is a decentralized, collaborative method where multiple, distributed agents train on local data, that is not distributed or shared, and build a shared, centrally orchestrated model while maintaining privacy. As an example, the federated reinforcement learning model can perform particular functions until the model either converges or reaches a maximum number of permitted iterations. For instance, the steps can include a global coordinator creating an initial model which is sent to each distributed agent whereby agents access the latest global model; a local model is trained by each of the agents according to the agents own dataset; updates of model parameters are sent to the global coordinator; the global coordinator combines the model updates using aggregation algorithms; the combined model is sent to the distributed agents.

Figure 3:
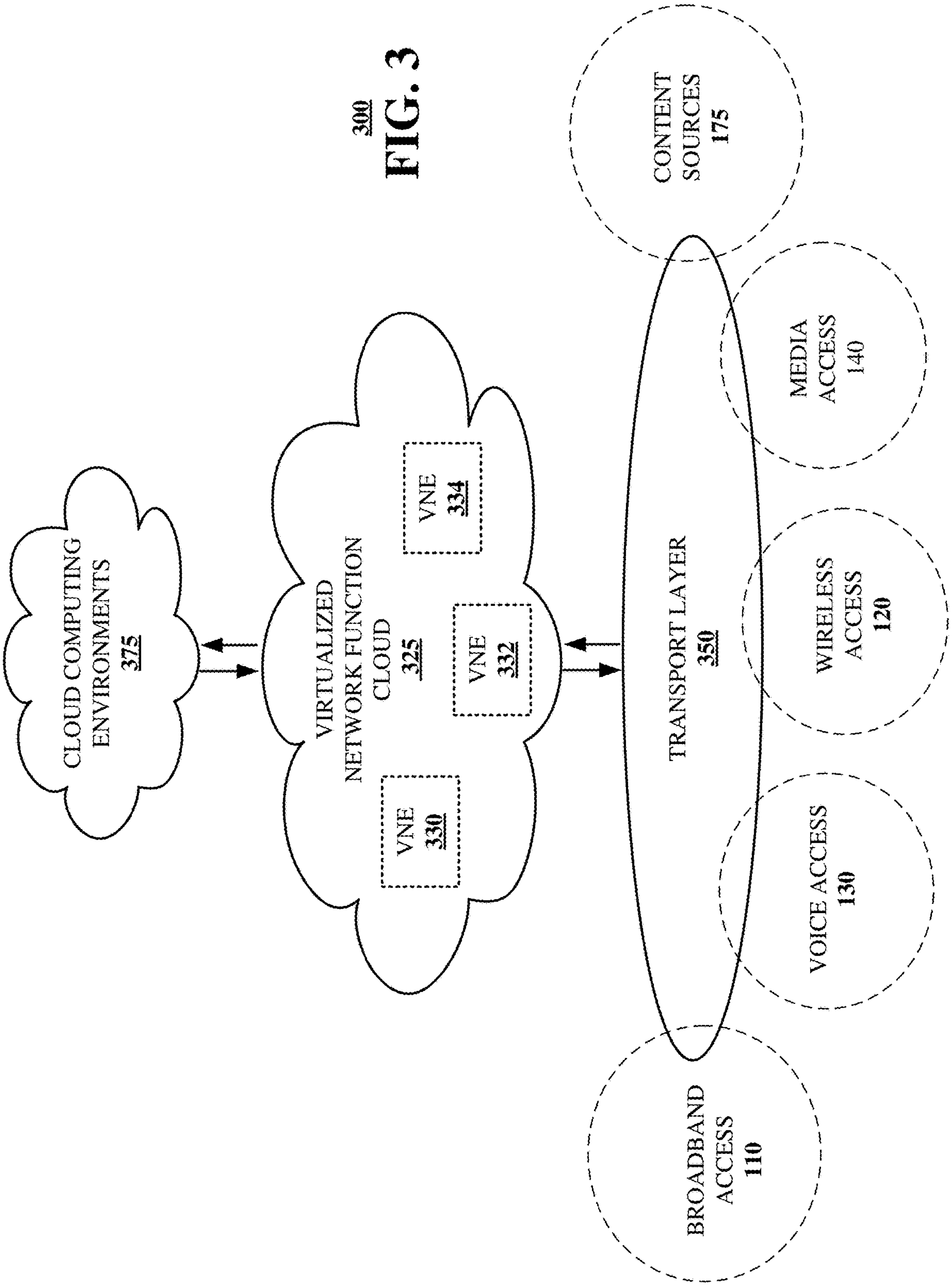
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A-2H and 3. For example, virtualized communication network 300 can facilitate in whole or in part providing a model from a global node to a group of nodes of the network where the model is associated with determining a configuration of the network for at least one of distribution or usage of qubits; receiving from one or more nodes of the group of nodes at the global node updated model parameters where the updated model parameters are generated by each of the one or more nodes via training of a local model utilizing the model and local data accessible to the particular node of the one or more nodes resulting in local models and where the global node does not receive the local data; generating an updated model at the global node based on the updated model parameters where the updated model is associated with determining the configuration of the network for qubits (e.g., at least one of distribution or usage of qubits); storing by the global node at least one of the updated model or the updated model parameters in a blockchain database; and providing the updated model to the group of nodes of the network. The model can then be utilized for management of qubits, including distribution, usage, and so forth.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
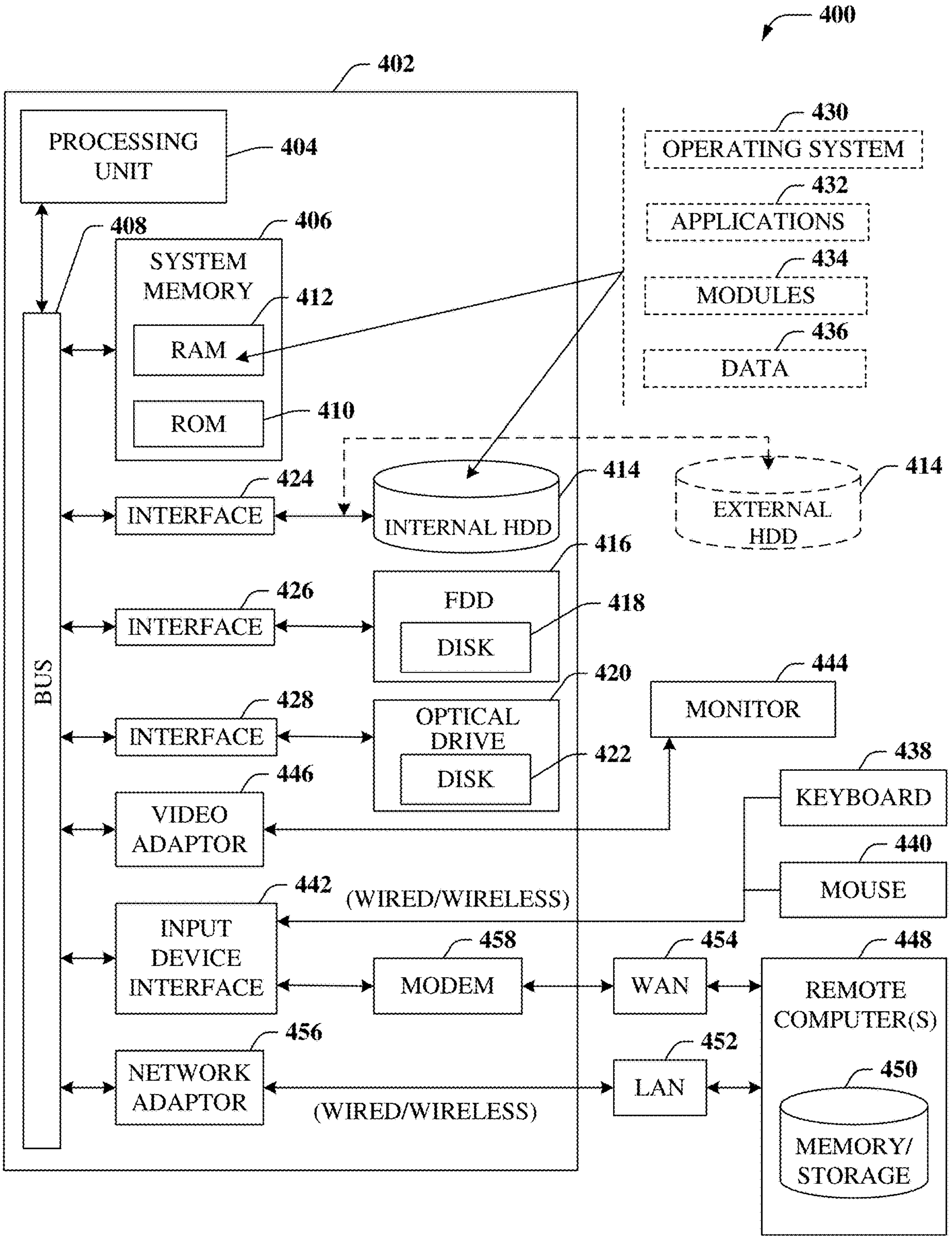
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing a model from a global node to a group of nodes of the network where the model is associated with determining a configuration of the network for at least one of distribution or usage of qubits; receiving from one or more nodes of the group of nodes at the global node updated model parameters where the updated model parameters are generated by each of the one or more nodes via training of a local model utilizing the model and local data accessible to the particular node of the one or more nodes resulting in local models and where the global node does not receive the local data; generating an updated model at the global node based on the updated model parameters where the updated model is associated with determining the configuration of the network for qubits (e.g., at least one of distribution or usage of qubits); storing by the global node at least one of the updated model or the updated model parameters in a blockchain database; and providing the updated model to the group of nodes of the network. The model can then be utilized for management of qubits, including distribution, usage, and so forth.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
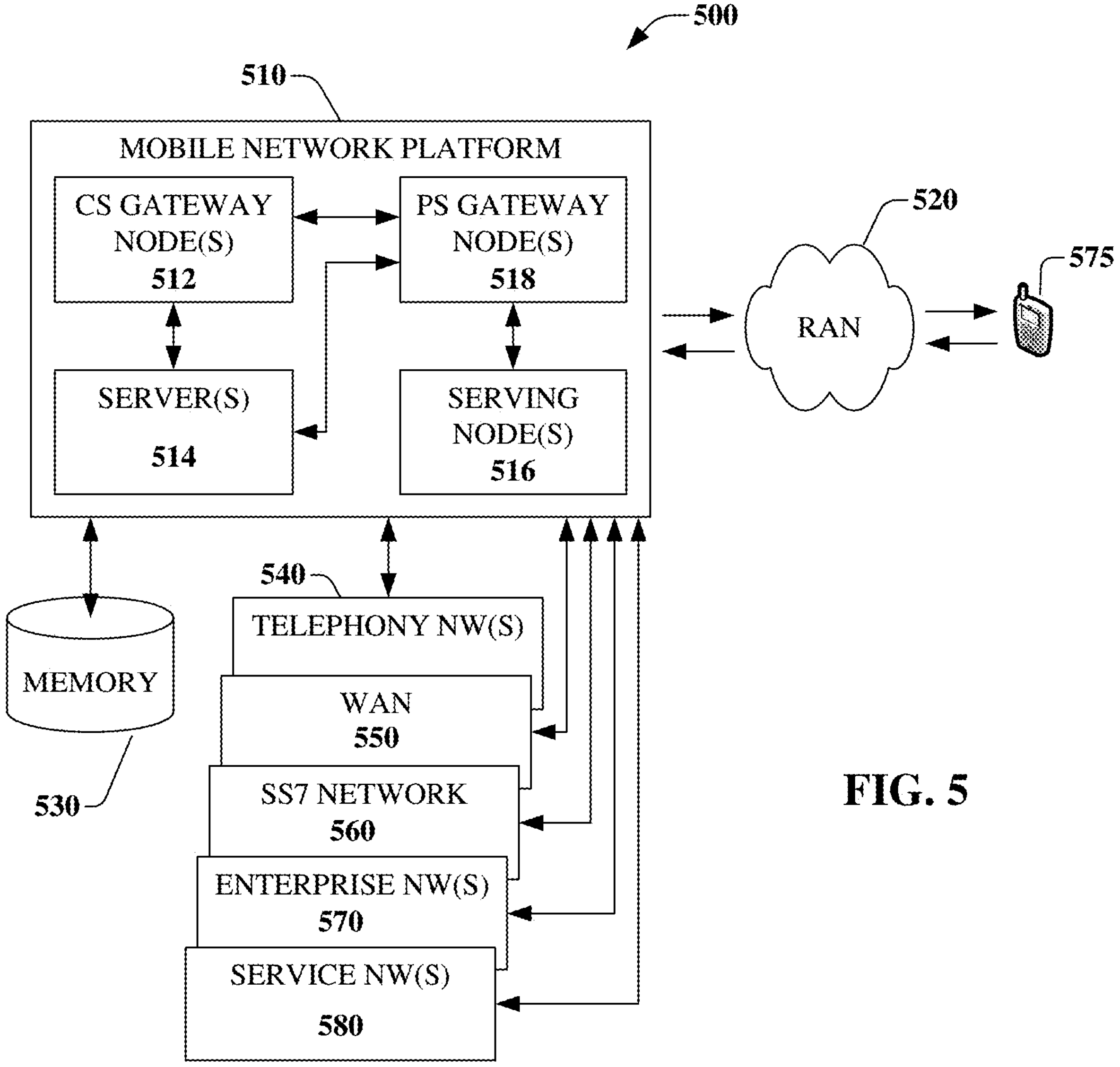
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing a model from a global node to a group of nodes of the network where the model is associated with determining a configuration of the network for at least one of distribution or usage of qubits; receiving from one or more nodes of the group of nodes at the global node updated model parameters where the updated model parameters are generated by each of the one or more nodes via training of a local model utilizing the model and local data accessible to the particular node of the one or more nodes resulting in local models and where the global node does not receive the local data; generating an updated model at the global node based on the updated model parameters where the updated model is associated with determining the configuration of the network for qubits (e.g., at least one of distribution or usage of qubits); storing by the global node at least one of the updated model or the updated model parameters in a blockchain database; and providing the updated model to the group of nodes of the network. The model can then be utilized for management of qubits, including distribution, usage, and so forth. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
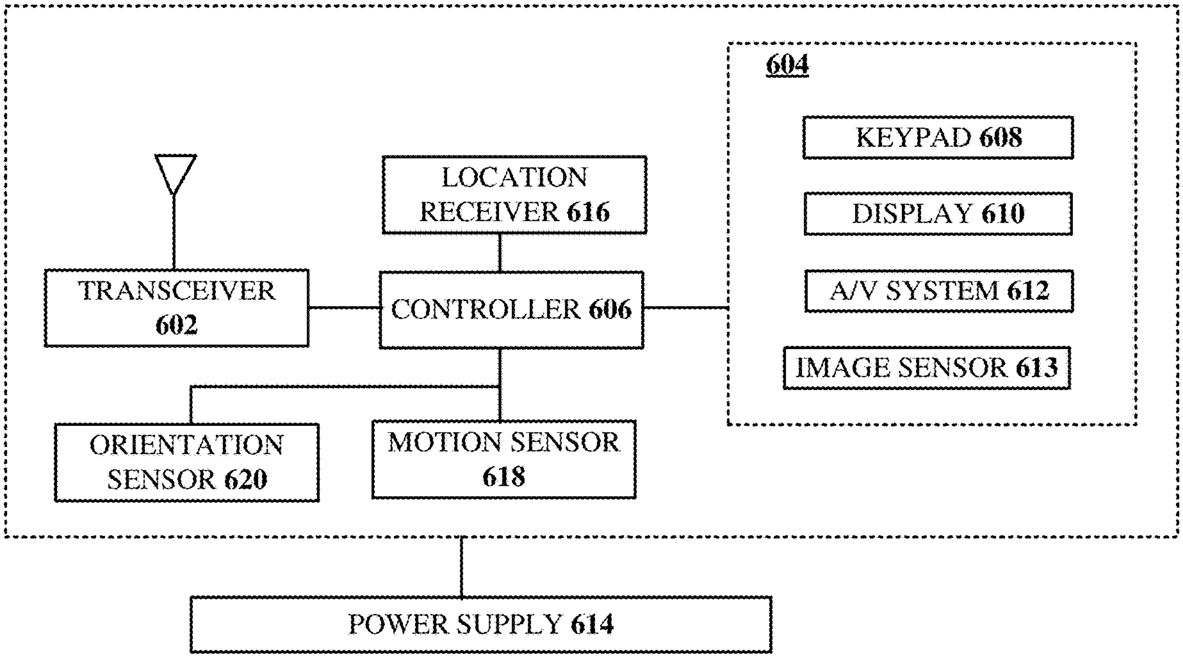
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing a model from a global node to a group of nodes of the network where the model is associated with determining a configuration of the network for at least one of distribution or usage of qubits; receiving from one or more nodes of the group of nodes at the global node updated model parameters where the updated model parameters are generated by each of the one or more nodes via training of a local model utilizing the model and local data accessible to the particular node of the one or more nodes resulting in local models and where the global node does not receive the local data; generating an updated model at the global node based on the updated model parameters where the updated model is associated with determining the configuration of the network for qubits (e.g., at least one of distribution or usage of qubits); storing by the global node at least one of the updated model or the updated model parameters in a blockchain database; and providing the updated model to the group of nodes of the network. The model can then be utilized for management of qubits, including distribution, usage, and so forth.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

providing a global model comprised of a first set of trained model parameters to a group of nodes of a communication network, wherein the global model is configured to determine a first configuration of the communication network for a first distribution of qubits or a first usage of qubits;

receiving, from a first node of the group of nodes, a second set of trained model parameters comprising quantum-classical graph neural network weights, wherein the second set of trained model parameters is generated by: (1) the first node identifying an occurrence of a first network event comprising an abnormal change in demand and/or capacity of the communication network, (2) the first node collecting local data, including quantum key performance indicators, in response to the identifying, and (3) the first node retraining a local version of the global model based on the local data to generate the second set of trained model parameters, wherein the device does not receive the local data;

updating the global model based on the second set of trained model parameters to generate an updated global model, wherein the updated global model is configured to determine a second configuration of the communication network for a second distribution of qubits or a second usage of qubits upon an occurrence of a second abnormal network event similar to or the same as the first network event, such that the second distribution of qubits or the second usage of qubits operates as reserve distributed compute capacity for the communication network that is accessible upon occurrence of the second network event;

storing the updated global model in a database; and providing the updated global model to the group of nodes of the communication network.

2. The device of claim 1, wherein the second configuration of the communication network comprises an identification of network devices for distribution or usage of entangled qubits.

3. The device of claim 2, wherein at least a portion of the entangled qubits of the network devices operate as reserve distributed compute capacity that is accessible when an event threshold is satisfied.

4. The device of claim 1, wherein the local version of the global model employs quantum federated reinforcement learning.

5. The device of claim 1, wherein the local version of the global model employs quantum computing of graph adjacency matrices.

6. The device of claim 1, wherein the local data is not shared with other nodes of the group of nodes.

7. The device of claim 1, wherein the database is a quantum-classical graph blockchain database that stores one of smart contract ledgers, network topology, network performance parameters, or a combination thereof, which is accessible to the first node of the group of nodes.

8. The device of claim 1, wherein at least one of the updated global model or the local version of the global model employs a quantum-classical graph neural network to estimate network capacity metrics for a network topology, routing, traffic measurements, qubit memory, and optimized qubit bandwidth storage of the communication network, wherein normalized quantum key performance indicators (QKPIs) for a target network and QKPIs from other networks with selected topology and performance metrics are utilized as model training data for the quantum-classical graph neural network.

9. The device of claim 1, wherein the operations include executing superdense coding quantum communications protocols for communicating classical bits of information by only transmitting a smaller number of qubits between the device and a quantum-classical network element.

10. The device of claim 1, wherein the local data includes bandwidth storage, time, distance, and latency, and wherein the global model and the updated global model employ explainable machine learning.

11. The device of claim 1, wherein one or more nodes of the group of nodes produce local location tokens and user equipment (UE) applications produce trusted identity tokens.

12. The device of claim 1, wherein the second configuration of the communication network comprises an adjustment of network traffic based on stored capacity and network topology between low-latency channels sharing Bell State pairs and alternate path high-latency channels.

13. The device of claim 1, wherein the second configuration of the communication network comprises an identification of one of network elements, aerial devices, user devices, or a combination thereof that can operate as network devices for distribution or usage of entangled qubits.

14. A non-transitory machine-readable medium, comprising executable instructions that, when executed by a processing system including a processor of a network node, facilitate performance of operations, the operations comprising:

receiving a model from a global node of a communication network, the model being associated with determining a first configuration of the communication network for qubits;

obtaining local data of the communication network that is associated with the network node;

training a local model utilizing the model and the local data in response to identifying an occurrence of a first network emergency condition comprising an abnormal change in demand and/or capacity of the communication network;

determining updated model parameters according to the training, wherein the updated model parameters comprise federated reinforcement learning weights;

providing the updated model parameters to the global node; and receiving an updated model from the global node, wherein the updated model is trained based on the updated model parameters and is configured to determine a second configuration of the communication network for a distribution of qubits as reserve hybrid quantum-classical network capacity for bandwidth and computing when a second network emergency condition similar to or the same as the first network emergency condition occurs.

15. The non-transitory machine-readable medium of claim 14, wherein the second configuration of the communication network comprises an identification of network devices for distribution of entangled qubits, and wherein the providing of the updated model parameters to the global node is performed without providing the local data.

16. The non-transitory machine-readable medium of claim 15, wherein at least a portion of the entangled qubits of the communication network devices operate as reserve distributed compute capacity that is accessible when an event threshold is satisfied.

17. The non-transitory machine-readable medium of claim 14, wherein the operations further comprise producing a local location token and producing, via user equipment (UE) applications, trusted identity tokens.

18. The non-transitory machine-readable medium of claim 14, wherein the operations further comprise applying a quantum-classical graph neural network quantum machine learning process to determine low hybrid classical/quantum network utilization and distributing entangled qubits to network devices based on node resource capacity.

19. A method, comprising:

providing, by a global node, a global model comprised of a first set of trained model parameters to a group of nodes of a communication network, wherein the global model is configured to determine a configuration of the communication network for qubits;

receiving, by the global node from a first node of the group of nodes, a second set of trained model parameters comprising neural network weights and biases, wherein the second set of trained model parameters is generated by: (1) the first node identifying an occurrence of a first network event comprising an abnormal change in demand and/or capacity of the communication network, (2) the first node collecting local data, including quantum key performance indicators, in response to the identifying, and (3) the first node retraining the global model based on the local data to generate the second set of trained model parameters, wherein the global node does not receive the local data;

generating, by the global node, an updated global model based on the second set of trained model parameters; and providing, by the global node, the updated global model to the group of nodes of the communication network, wherein the updated global model facilitates managing distribution and usage of entangled qubit storage in devices of the communication network as reserve hybrid quantum-classical network capacity for bandwidth and computing when a second network emergency event similar to or the same as the first network emergency event occurs.

20. The method of claim 19, further comprising storing at least one of the updated global model or the second set of trained model parameters in a blockchain database, wherein the global node does not receive the local data, wherein the devices of the communication network include at least one of network elements, aerial devices, user devices, or a combination thereof, and wherein the local data is accessible to the first node and not other nodes of the group of nodes.

* * * * *